(12) United States Patent
Shuster

(10) Patent No.: US 8,624,718 B2
(45) Date of Patent: *Jan. 7, 2014

(54) ALERT SIGNAL CONTROL USING RECEIVER VELOCITY

(71) Applicant: Gary Stephen Shuster, Fresno, CA (US)

(72) Inventor: Gary Stephen Shuster, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,442

(22) Filed: May 20, 2013

(65) Prior Publication Data

US 2013/0244620 A1 Sep. 19, 2013

Related U.S. Application Data

(63) Continuation of application No. 13/540,592, filed on Jul. 2, 2012, now Pat. No. 8,446,270, which is a continuation of application No. 12/470,857, filed on May 22, 2009, now Pat. No. 8,212,661.

(60) Provisional application No. 61/055,290, filed on May 22, 2008.

(51) Int. Cl.
*B60Q 1/00* (2006.01)
*B60K 35/00* (2006.01)

(52) U.S. Cl.
CPC ..................................... *B60K 35/00* (2013.01)
USPC ......................... 340/438; 455/345; 455/456.4

(58) Field of Classification Search
USPC .................. 340/438; 455/418, 419, 344, 345, 455/456.4–456.6, 557
See application file for complete search history.

(56) References Cited

U.S. PATENT DOCUMENTS

| | | | |
|---|---|---|---|
| 6,690,940 B1 | 2/2004 | Brown et al. |
| 6,782,240 B1 | 8/2004 | Tabe |
| 6,912,386 B1 | 6/2005 | Himberg et al. |
| 7,065,349 B2 | 6/2006 | Nath et al. |

(Continued)

FOREIGN PATENT DOCUMENTS

| | | |
|---|---|---|
| JP | 2001333156 A | 11/2001 |
| JP | 2005348329 A | 12/2005 |
| JP | 2006186652 A | 7/2006 |
| JP | 2006295387 A | 10/2006 |

(Continued)

*Primary Examiner* — John A Tweel, Jr.
(74) *Attorney, Agent, or Firm* — Novak Druce Connolly Bove + Quigg LLP; Jonathan Jaech

(57) ABSTRACT

An electronic communication system provides text or voice messages to remote receiving devices, such as cell phones or PDA's. The remote receiving devices are equipped with velocity sensors, or position sensors from which velocity may be inferred. The remote receiving devices periodically report a velocity or current position to an alert signal control node of the communication system. The alert signal control node determines a most recent-determinable velocity for each receiving device before transmitting a message alert signal. If the velocity exceeds a predetermined threshold, the alert signal may be delayed until the velocity drops below the threshold. The system may be operated as a safety measure to prevent reception of distracting alert signals while driving, thereby silencing messaging devices at appropriate times.

20 Claims, 2 Drawing Sheets

(56) References Cited

U.S. PATENT DOCUMENTS

| | | |
|---|---|---|
| 7,181,229 B2 | 2/2007 | Singh et al. |
| 7,505,784 B2 | 3/2009 | Barbera |
| 8,212,661 B2 | 7/2012 | Shuster |
| 8,446,270 B2 * | 5/2013 | Shuster .................. 340/438 |
| 2006/0121887 A1 | 6/2006 | Chilukoor |
| 2007/0004407 A1 | 1/2007 | Biggs |
| 2007/0030159 A1 | 2/2007 | Stoev et al. |
| 2007/0067105 A1 | 3/2007 | Lee et al. |
| 2007/0091847 A1 | 4/2007 | Lee |

FOREIGN PATENT DOCUMENTS

| | | |
|---|---|---|
| JP | 2007101406 A | 4/2007 |
| JP | 2007274074 A | 10/2007 |
| JP | 2007325295 A | 12/2007 |
| JP | 2007331520 A | 12/2007 |

* cited by examiner

ALERT SIGNAL CONTROL USING RECEIVER VELOCITY

CROSS-REFERENCE TO RELATED APPLICATION

This application is a continuation of U.S. application Ser. No. 13/540,592, filed Jul. 2, 2012, now Pat. No. 8,446,270, which is a continuation of U.S. application Ser. No. 12/470,857, filed May 22, 2009, now Pat. No. 8,212,661, which claims priority pursuant to 35 U.S.C. §119(e) to U.S. provisional application Ser. No. 61/055,290, filed May 22, 2008, which applications are hereby incorporated by reference, in their entireties.

BACKGROUND

1. Field

This application relates to mobile telephones and other mobile portable communications devices, and to controlling the alert signal for such devices.

2. Description of Related Art

Portable cellular telephones and handheld messaging devices generally include one or more transducers to provide audible, tactile or visible alert signals indicating various forms of incoming messages. Incoming messages may include, for example, live telephone calls, voice messages, electronic mail, and text messages. Users generally carry such portable phones and messaging devices on their person for much or all of the day, and consequently distracting alert signals may be emitted by the portable device at inappropriate times. Portable messaging systems often provide a means for disabling any desired alert signal, but these means require the user to manually disable the alert signal via a switch or user input command. Likewise, re-enabling the alert signal generally requires manual input. Users may find it inconvenient

SUMMARY

This technology therefore provides for automatic disabling and re-enabling of an alert signal for a portable messaging device, in response to sensory input collected by a sensor in communication with the messaging device. The sensor may be physically near the messaging device, connected to the messaging device via a suitable interface, incorporated into the same housing as the messaging device, or any combination of the foregoing. For example, a GPS sensor or other locating system may be integrated into a portable messaging device configured to respond to sensor input to determine, in conjunction with governmental, system operator, sender, or end user defined parameters, when the messaging device emits an alert signal as notification of incoming or received messages.

For example, when a cellular phone or other portable device receives sensor input indicating that it is in motion at a speed greater than a preset limit, or has recently been in such motion within a set time period, message delivery (or, alternatively, notice that a message has been delivered) may be delayed until such time that the device is not in motion (or has been not in motion for a set time period). In this manner, alert signal notification of inbound messages, phone calls, emails, SMS texts, or even pre-set alarms (such as an internally entered appointment reminder on the device) are delivered to the user in a manner that does not impair safety. Optionally, this setting may be changed by the user when the user is able to deal with such messages safely despite being in motion, such as when the user is a passenger in a vehicle, not the driver. In addition, the device may utilize location or motion information transmitted from the vehicle, may utilize data as to the cellular tower and distance from the tower (and increasing or decreasing signal strength indicating movement toward or away from a tower), or the fact that it is "paired" with a vehicle sound system (as via Bluetooth™) to indicate motion or potential motion.

A threshold may be defined requiring motion greater than a certain speed, with operating logic to ensure that motion under, for example, 5 miles per hour, is not sufficient to trigger disabling of the alert signal. Likewise, when motion drops below a predetermined threshold the alert signal may be re-enabled. So as an example, a user driving at 5 miles per hour has a portable messaging device (PMD) that works normally, but when he exceeds 5 miles per hour the PMD may sense this and switch to a mode where all alerts other than phone calls (or even including phone calls) are silenced until the vehicle reaches a speed under 5 miles per hour again.

BRIEF DESCRIPTION OF THE DRAWINGS

The present invention, in accordance with one or more various embodiments, is described in detail with reference to the following figures. The drawings depict embodiments of the invention, by way of example.

DETAILED DESCRIPTION

Figure 1:
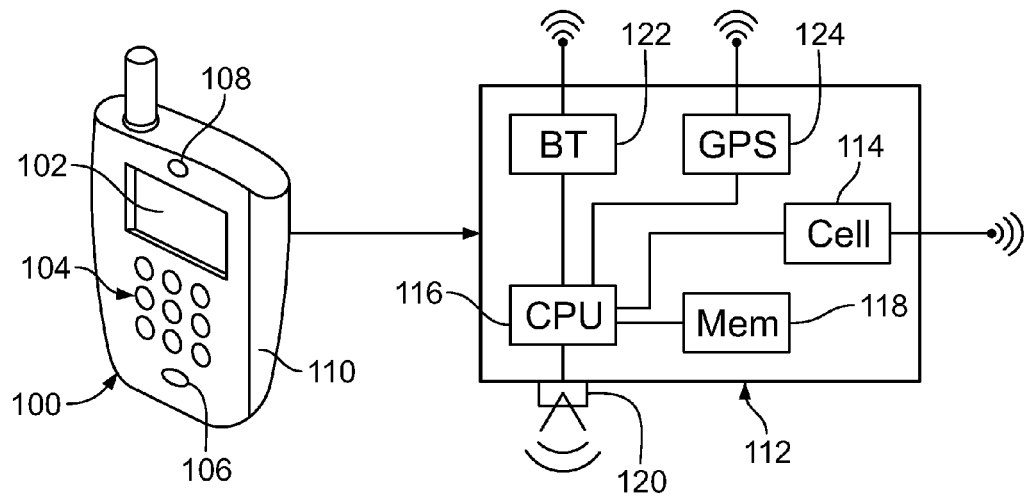
FIG. 1 shows an example of a portable messaging device with alert signal control means.

FIG. 1 shows an exemplary portable messaging device 100 including familiar interface components such as a display screen 102, keypad 104, microphone 106, audio transducer 108 and housing 110 sized for handheld use. A circuit 112 (shown schematically) may be enclosed in the housing 110.

Circuit 112 may comprise various components in electronic communication with one another, including a cellular transmitter/receiver 114 connected to a central processor 116. CPU 116 may be connected to receive input from the keypad, microphone, or other input device, and operates system and application software stored in system memory 118. CPU 116, either directly or via an interface circuit (not shown) may drive an audio output transducer 120 for outputting an alert signal and/or audio message content. Other output signaling devices may also be used, such as a mechanical vibrator for outputting a tactile alert signal or a signal light, such as one or more L.E.D.'s, for providing a visual alert. The display 102 may also be used to provide a visual alert signal. The CPU, memory, and cellular transmitter/receiver may be considered core components for performing primary communication functions of device 100.

Circuit 112 may further comprise ancillary components for performing sensing functions, or for communicating with an external sensor. By way of example, two such components are shown, a wireless frequency-hopping spread spectrum (e.g., Bluetooth™) module 122 for communicating with external Bluetooth-enabled devices, and a Global Positioning System (GPS) receiver for determining geographical location. Either or both of these components may be used. In this disclosure, embodiments using GPS or Bluetooth™ modules are discussed in more detail, but the technology is not limited thereby. Other useful sensors may include a light sensor, enabling automatic control of the alert signal responsive to external impinging light levels or temporal patterns, or a microphone for enabling similar control in response to external sound levels and patterns. Circuit 112 may also include a system clock or timer for measuring a current time, or elapsed time.

Alert signal control as described herein should be distinguished from command-based control. The Bluetooth™ unit 122, the GPS receiver 124, and other input sensors (if used) are not used merely for command control of the auto-disable feature. Instead, sensors are used for determining a present environmental status of the mobile device, and then decision logic is applied using the CPU in response to sensor input, to determine how alert signals for incoming messages should be controlled. Therefore, the portable device 100 responds differently to incoming messages depending on an external measured environmental state that is determined without command input. Of course, the use of environmental-based alert signal control need not exclude command-based control, of which complementary use may often be desirable. For example, circuit 112 may be configured to permit configuration of an auto-alert disable system in response to user command input.

One environmental variable of interest in alert signal control may include velocity. It may be desirable to mute (disable) the alert signal when the phone is moving at greater than a specified speed. A current velocity may be easily determined by reference to a GPS receiver and a system clock or timer. Other methods of determining location may also be suitable, such as by triangulation from any other known transmitters that make up a cellular network. However with present technology GPS locating is both accurate and relatively inexpensive, and may provide a suitable means for determining the mobile device's present location.

Figure 2:
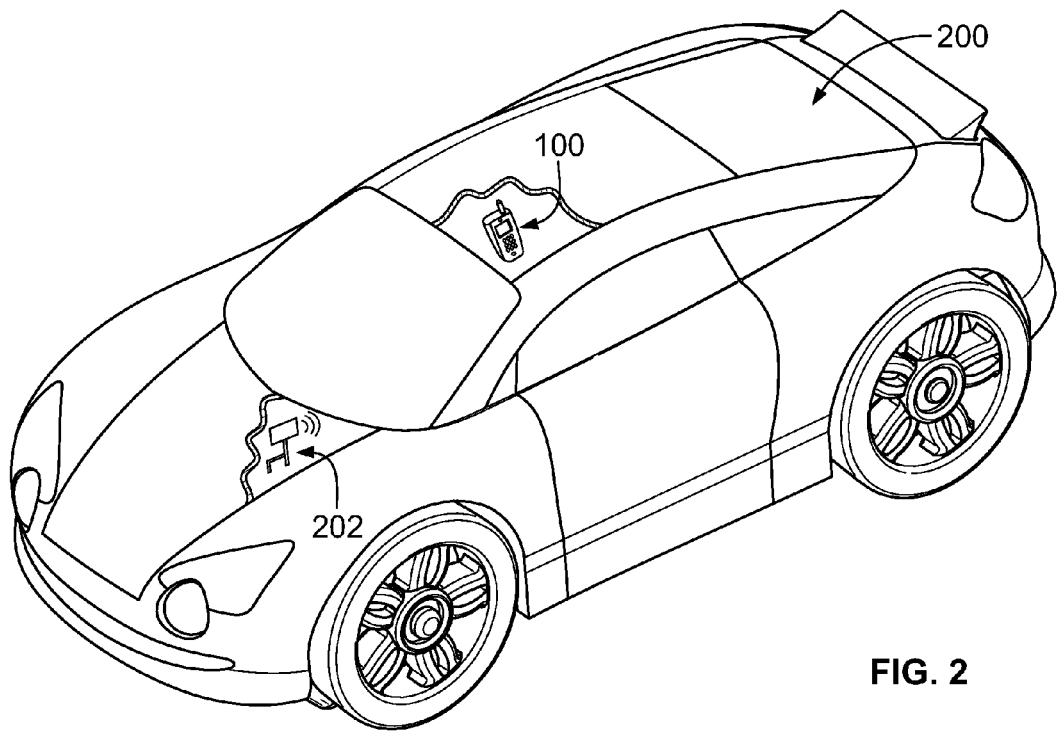
FIG. 2 shows an example of a system using an automobile and wireless transmitter for alert signal control.

In lieu of an internal GPS receiver 124, device 100 may obtain its location and/or speed from any external source. This may be conveniently accomplished via a Bluetooth™ transmitter/receiver as currently implemented in many cellular phones. Circuit 112 may periodically scan for an authorized external Bluetooth™ signal to obtain environmental data. For example, a Bluetooth™ transmitter/receiver 202 may be integrated into the electrical system of an automobile 200, as shown in FIG. 2. As such, the device 100 may have access to GPS location data via a GPS receiver installed or located in the automobile. Device 100 may also receive current velocity information from the speedometer of car 200 via the Bluetooth™ interface 202. Use of Bluetooth™ is merely exemplary, and alternative communication standards may also be used, including but not limited to wired or wireless standards such as USB, wireless USB, Zigbee™ and UWB.

Device 100 may also determine its relative location inside car 200 via the Bluetooth™ component 202 or other transmitter. For example, relative signal strength or triangulation may be used within the car interior, if so equipped. In the alternative, the car 200 or device 100 may be configured to ask the user where in the car the phone is located, in response to detecting that it has entered into the vehicle. For example, when a user carrying device 100 enters car 200, the presence of the phone may be detected and an onboard computer may output a verbal question such as "Is John a driver or passenger?" to which the user may reply "passenger" or "driver" as the case may be. The onboard computer may inform device 100 of the response to the query. The mobile device 100 may control the alert signal in accordance with the received response, for example, by disabling the alert signal on a speed-sensitive basis only if the response or other sensor data indicates that the mobile device is being used by the driver. The driver will therefore not be distracted by alert signals from device 100 while driving the car above a defined threshold speed, which may be any number of zero or greater.

Device 100 may also consider message parameters when determining whether to disable alert signaling. For example, certain message senders may have a capability to mark some messages or incoming calls as "urgent." Device 100 may be configured to selectively disable alert signals for incoming messages that are not marked as "urgent" by an authorized sender, while providing alert signals for urgent messages regardless of sensor input, or only in a narrower range of environmental conditions. For example, device 100 may provide alert signals for "urgent" marked messages while moving up to speeds of 60 miles per hour and for all other messages while moving up to five miles per hour.

Use of a self-contained locating and velocity-measuring system in device 100 may be advantageous for other reasons. For example, a portable communication device equipped with a GPS locating system may provide various location-based services, including navigational guidance and location-specific advertising. Use of the GPS system for velocity determination in such a GPS-equipped device may be merely incidental, and therefore may add negligible cost to the device.

Figure 3:
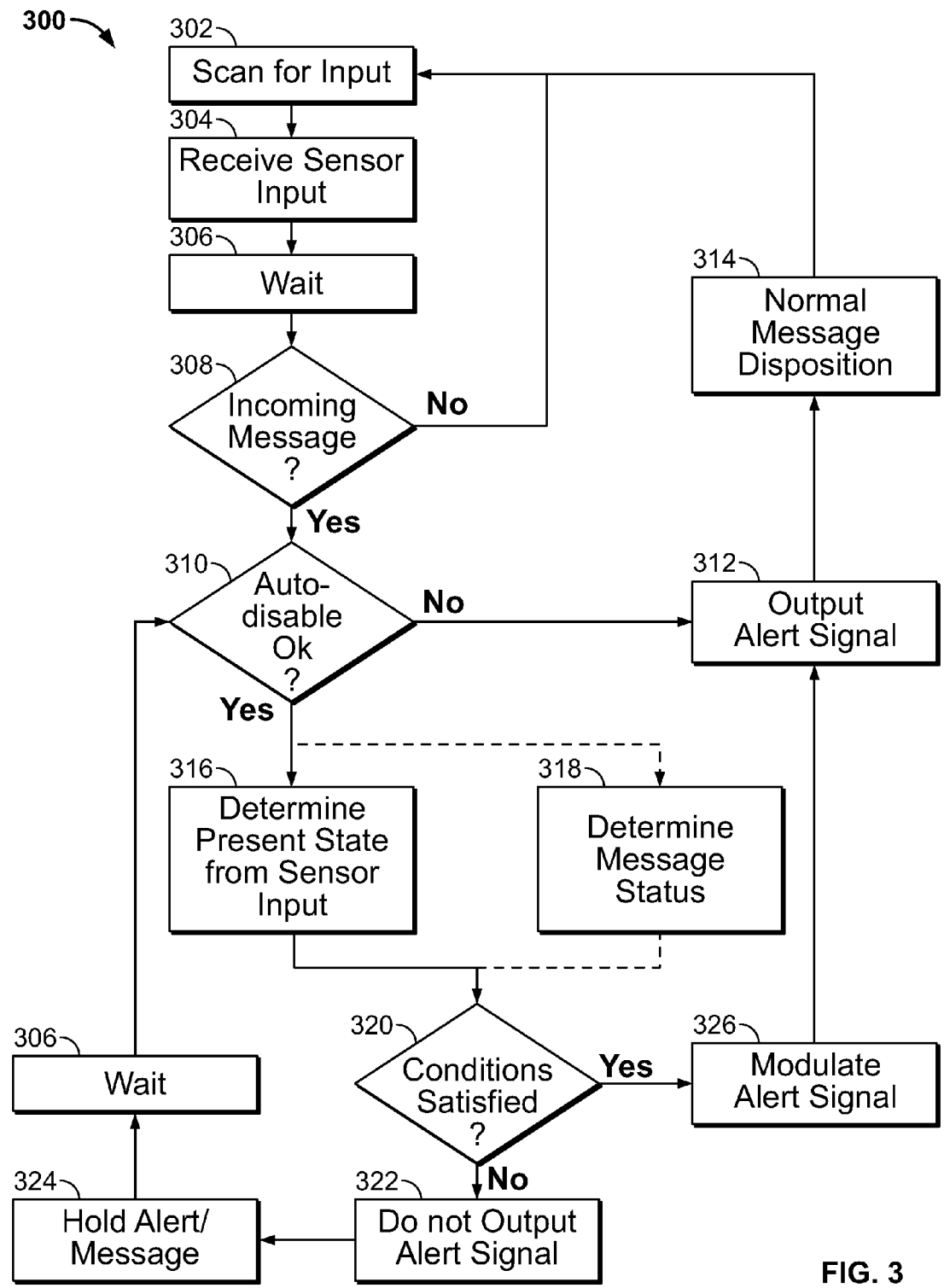
FIG. 3 shows a method 300 for controlling alert signaling in a portable messaging device.

FIG. 3 shows a method 300 for controlling alert signaling in a portable messaging device, such as may be performed using software or firmware operating in a device as described herein. Method 300 represents a performance loop that may be initialized shortly after powering up the device. A computer-readable medium may be used to store program instructions, that when executed by a processor of the portable messaging device, cause the device to perform as described herein below. After the loop is initialized, the device may scan for input 302 to one or more ports capable of receiving sensor (e.g., GPS) input. Scanning may be done periodically, and/or in response to an interrupt originating from a sensor device. In the alternative, or in addition, the device may periodically request sensor input from a connected sensor, which may respond to the device's requests with sensor data. The device may also wirelessly broadcast a query signal seeking a response from any sensors that may be available in the immediate area.

After scanning for incoming sensor data, the device may receive and process sensor data 304. The sensor data may be time stamped and held in a memory of the device for later use. In the case of velocity determination, two or more of the most recent positional sensor data (indicating a current position of the sensor) may be held in system memory. In the alternative, or in addition, the device may calculate a current velocity and store in memory. Sensor data may be processed as necessary to provide useful input for alert signal controlling. For example, a feature may be provided wherein the volume or intensity of the alert signal is modulated in response to ambient noise. The noisier the ambient environment, the louder the alert signal provided, and conversely the alert signal volume may be diminished in quieter environments. To accomplish this control, the processor may use microphone input to calculate an average noise level over a recent time slice, for example, for the most recent second or more recent ten seconds. The calculated noise level may then be stored in system memory for use in alert signal control. Similar use of sensor data may be used to silence or lower the volume of the alert signal when the environmental light levels are low.

The portable messaging device may normally be in a wait state 306, waiting to receive an incoming message. During waiting, the device may periodically cycle through scanning, receiving and storing sensor data as described above. The wait state may be interrupted when an incoming message is received 308. The feature of automatic signal disabling or automatic volume control as described herein may be subject to manual control, so that a user of the device may shut off this feature when it is not desired. Thus, before executing an alert signal control routine, the device may determine whether or not the automatic alert signal control feature has been temporarily turned off at 310. If automatic control has been disabled, the device may output an alert signal 312 according to default or user-specified parameters, and dispose of the incoming message (whether phone call, text message, electronic mail, or other) in a normal fashion 314.

If automatic control has been enabled 310, the device may determine a most recent or a present environmental state 316 of the device by retrieving most recent stored sensor input from system memory. In the alternative, sensor input may be solicited and received in response to receipt of the incoming message 308. Examples of environmental state may include, for example, the position and velocity of the device, acceleration of the device, ambient noise level, ambient light level, or any other sensor-based measure that may be useful for controlling an alert signal. Optionally, the device may determine a message status 318 with respect to alert signal control. Message metadata or other characteristics may indicate a special status used to modulate the alert signal, for example "message type," (e.g., "voice call", "e-mail" etc.) "urgent," "normal," or "low-priority." Status indicators such as these may be used to determine how to control that alert signal in conjunction with the environmental indicators.

After collecting environmental and (optionally) message parameters, the portable messaging device may evaluate the parameters against defined rules to determine whether or not conditions have been satisfied 320 for providing an immediate alert signal. Various exemplary rules have been described above. For example, the alert signal may be disabled if the device is moving at greater than a threshold velocity, if the ambient light levels are too low, etc. Even an ambient temperature may be used as input to a control scheme, as it may indicate whether or not the device is being worn close to a user's body. If conditions for providing an alert signal are not satisfied, the device does not output an alert signal 322 at that time. The device may delay output of the alert signal and may hold the incoming message in a memory 324, and wait 306 until environmental conditions change to satisfy conditions for providing an alert. Live messages such as incoming voice calls may be rolled over to voice mail while other messages may be placed in a message inbox. During a wait period, additional sensor input may be scanned for 302 or received 304. Program execution may then loop periodically back to environmental testing 316 and 320, so that the alert signal can be re-enabled once environmental conditions (e.g., device velocity decreased to safe level) are satisfied 320.

If conditions for providing an alert signal are satisfied 320, the device may determine how to modulate the alert signal 326 in response to environmental or message parameters. Different signals may be provided based on message priority type or urgency level. The volume or intensity of the alert signal may be controlled based on sensor input as previously described, for example, by changing the alert signal volume or changing the alert tone. In the alternative, the alert signal is not modulated and step 326 is omitted. The device may then output the alert signal 312, and dispose of the message 314 in a conventional fashion.

The method 300 merely exemplifies a control scheme for controlling an alert signal in response to environmental sensor input. The present technology is not limited by this example.

What is claimed is:

1. A portable messaging device, comprising:
    a wireless receiver;
    a processor coupled to the wireless receiver;
    a velocity sensor communicatively coupled to the processor;
    a memory coupled to the processor; the memory holding program instructions that when operated by the processor, cause the portable messaging device to automatically disable audible alert signaling for an incoming message in response to determining, based on information from the velocity sensor, that a current velocity of the portable messaging device exceeds a threshold.

2. The portable messaging device of claim 1, wherein the program instructions are further configured for automatically re-enabling audible alert signaling for incoming messages, in response to determining that the current velocity of the portable messaging device no longer exceeds the threshold, based on information from the velocity sensor.

3. The portable messaging device of claim 1, wherein the program instructions are further configured for obtaining message priority information from incoming messages, and selectively disabling the audible alert signaling additionally in response to determining, for each one of the incoming messages, that the message priority is not higher than a defined priority threshold.

4. The portable messaging device of claim 1, wherein the program instructions are further configured for holding the incoming message for which the alert signal is automatically disabled in a memory until a later time.

5. The portable messaging device of claim 1, further comprising a wireless receiver coupled to the processor and configured to receive the information from the velocity sensor from an on-board transmitter in a vehicle.

6. The portable messaging device of claim 1, wherein the velocity sensor comprises a GPS receiver configured to receive a GPS locating signal.

7. The portable messaging device of claim 6, wherein the velocity sensor further comprises a timer.

8. The portable messaging device of claim 7, wherein the program instructions are further configured for determining the current velocity using the GPS locating signal and a time signal from the timer.

9. The portable messaging device of claim 1, wherein the program instructions are further configured measure a duration for which the current velocity is maintained continuously above the threshold, and automatically disabling audible alert signaling for incoming messages is further conditioned on determining that the duration exceeds a minimum time period.

10. A method comprising:
    determining a current velocity of a portable wireless messaging device using a processor of the portable messaging device coupled to a velocity sensor, based on information from the velocity sensor;
    receiving an incoming wireless message, by the messaging device; and
    controlling emission of an audible alert signal from the portable messaging device in response to determining that the current velocity of the portable messaging device is greater than a threshold.

11. The method of claim 10, further comprising holding the incoming message in a memory of the portable wireless messaging device until a later time.

12. The method of claim 10, further comprising determining the current velocity by receiving a velocity signal from a velocity sensor installed in a motor vehicle.

13. The method of claim 10, further comprising determining the current velocity from a GPS signal and a clock signal.

14. The method of claim 10, further comprising re-enabling the audible alert signal for signaling an incoming message, in response to determining that the current velocity is not greater than the defined threshold.

15. The method of claim 10, further comprising reading a priority level assigned to the incoming message, and preventing the portable wireless messaging device from emitting any audible alert signal only if the priority level is lower than a defined level.

16. A non-transitory computer-readable medium encoded with instructions that, when executed by a processor, cause a portable wireless device to:
   determine a current velocity of a portable wireless messaging device using a processor of the portable messaging device coupled to at least one velocity sensor, based on information from the velocity sensor;
   receive an incoming wireless message; and
   control emission of an audible alert signal to signal the incoming message, in response to determining that the current velocity of the portable messaging device is greater than a threshold.

17. The computer-readable medium of claim 16, further encoded with instructions that, when executed by the processor, cause the portable wireless device to determine the current velocity by receiving a velocity signal from a velocity sensor installed in a motor vehicle.

18. The computer-readable medium of claim 16, further encoded with instructions that, when executed by the processor, cause the portable wireless device to determine the current velocity from a GPS receiver and clock coupled to the processor.

19. The computer-readable medium of claim 16, further encoded with instructions that, when executed by the processor, cause the portable wireless device to disable the alert signal only for incoming messages having a priority status indicating that disabling of the alert signal is permissible.

20. The computer-readable medium of claim 16, further encoded with instructions that, when executed by the processor, cause the portable wireless device to scan for sensor input for use in determining a current velocity.

\* \* \* \* \*